United States Patent
Sato (10) Patent No.: US 7,085,032 B2
(45) Date of Patent: Aug. 1, 2006

(54) LIGHT REGULATOR AND IMAGE PICKUP SYSTEM

(75) Inventor: Masayoshi Sato, Kofu (JP)

(73) Assignee: Nisca Corporation, Yamanashi-Ken (JP)

(*) Notice: Subject to any disclaimer, the term of this patent is extended or adjusted under 35 U.S.C. 154(b) by 0 days.

(21) Appl. No.: 11/127,263

(22) Filed: May 12, 2005

(65) Prior Publication Data

US 2006/0033974 A1    Feb. 16, 2006

(30) Foreign Application Priority Data

Aug. 13, 2004  (JP) ............................. 2004-235751

(51) Int. Cl.
*G02B 26/02* (2006.01)

(52) U.S. Cl. .................. 359/230; 359/234; 396/510
(58) Field of Classification Search ............ None
See application file for complete search history.

(56) References Cited

U.S. PATENT DOCUMENTS

| 5,997,187 A * | 12/1999 | Hamasaki .................. 396/449 |
| 6,867,932 B1 * | 3/2005 | Noguchi ..................... 359/739 |
| 2005/0264770 A1 * | 12/2005 | Hara et al. .................... 353/97 |

* cited by examiner

Primary Examiner—James Phan
(74) Attorney, Agent, or Firm—Manabu Kanesaka (57) ABSTRACT

A light regulator includes a substrate having an optical aperture, an even number of blade members (six or more) arranged substantially uniformly around the optical aperture, and spindles provided on the substrate for freely rotatably supporting base end portions of the blade members. The blade members are overlapped with each other at edges thereof, and tip portions thereof face the optical aperture. The blade members on the substrate are divided into a first blade set and a second blade set. The first blade set includes at least two first blade members overlapping with each other. The first blade members are rotatably supported at the base end portions thereof on the spindles, and tip portions of the first blades are placed inside an edge of the optical aperture when the first blades are fully closed.

7 Claims, 12 Drawing Sheets

LIGHT REGULATOR AND IMAGE PICKUP SYSTEM

BACKGROUND OF THE INVENTION AND RELATED ART STATEMENT

The present invention relates to a light regulator incorporated in an image pickup system such as a video camera, a still camera, a projector, and a projection system for regulating light upon picking up or projecting an image. The present invention also relates to an image pickup system incorporating the light regulator in a lens barrel.

A light regulator includes a substrate having an optical aperture at an optical path for picking up or projecting an image. At the optical aperture formed in the substrate, one or more blade members are placed. By operating the blade member to open or close, a diameter of the optical aperture is increased or decreased for regulating light. Such a light regulator is widely used due to a relatively simple configuration. For precisely regulating light in multiple levels with such a light regulator, a so-called iris diaphragm is well known. That is, a plurality of blades is arranged uniformly around an optical aperture. In accordance with the number of blades, an aperture diaphragm has a regular-polygon shape such as regular-pentagon and regular-hexagon maintaining a similar shape while a diameter of the aperture diaphragm is changed.

More specifically, around the optical aperture formed in the substrate, a plurality of blades is arranged uniformly such that edges of adjacent two blades are overlapped. The blades are supported at their base end portions by spindles formed on the substrate to freely rotate, and tip portions of the blades face the optical aperture to form the aperture diaphragm. The blade members rotate by a predetermined amount so as to obtain a desired diaphragm diameter.

Such a configuration of the blade member includes two types. One blade type is relatively short in length with acute-angled tip portions, and the blades are overlapped together sequentially to face the optical aperture. The tip portions of the blades are placed inside an aperture edge of the optical aperture to form an aperture diaphragm at most of open/close area. The other blade type is relatively long in length, and tip portions thereof are supported by a substrate around an optical aperture entirely over the open/close area. With the short blade type, every blade is short and small so that their overlapping portion (area) is accordingly small. The drive unit can be thus downsized with lower torque, whereby the system can be advantageously small and compact in size as a whole.

The problem here is that, however, the tip portions of the blades are easily deformed due to their positioning, i.e., the substrate supports only their base end portions, and their tip portions are protruding inside the aperture edge at most of the open/close area. When external forces are applied to the system, the blade tip portions are vibrated so that the light varies in amount. If the blade tip portions are deformed, e.g., warped, blade interference occurs together with light variation, and thus the overlapping blades get stuck with each other, whereby the blades fail to open or close. Such a demerit limits the type of systems such as cameras for use and their use environment, and thus only a limited number of optical devices become applicable.

With the long blade type, the substrate supports the blade tip portions entirely over the open/close area to be ready for backup, and the resulting system can advantageously withstand vibrations occurring thereto and deformation resulted from environmental temperature change. On the other hand, the problem with such long and large blades is that a space occupied thereby is large, and friction among the blades or between the blades and the substrate becomes large. Further, the system is disadvantageously increased in size. In the conventional systems, one of the two different blade types are selected, and the blades are generally configured to be in the same shape.

As described above, when the acute-angled blade tip portions facing the optical aperture form the aperture diaphragm, the blade tip portions configuring the aperture diaphragm may deform. In the configuration, the substrate supports only the blade base end portions, and the deformed blade tip portions cause light variation or a malfunction resulted from the blades getting stuck in each other. To solve such a problem, the blades may be formed large and the blade tip portions may be supported by the substrate around the optical aperture entirely over the open/close area. Such a configuration arises, however, another problem of increasing the system size as described above.

The conventional light regulators have been manufactured with blade configuration and shape appropriate for specifications of cameras or other various optical devices. Accordingly, it is difficult to apply to various optical devices in various environmental conditions.

In view of the problems described above, an object of the present invention is to provide a relatively small light regulator capable of smoothly opening and closing without light variation due to blade deformation, and to provide an image pickup system and a projector using the light regulator. In the present invention, a plurality of blade members configuring an aperture diaphragm at an optical aperture has different shapes to reduce an adverse effect caused by deformation of a blade member or large blade member, thereby preventing blade interference at overlapping portions of the blade members.

Further objects and advantages of the invention will be apparent from the following description of the invention.

SUMMARY OF THE INVENTION

In order to achieve the objects described above, according to the present invention, a light regulator includes a substrate having an optical aperture; an even number of blade members (six or more) arranged substantially uniformly around the optical aperture; and spindles provided on the substrate for supporting base end portions of the blade members to be freely rotatable. The blade members are overlapped at edges thereof with each other, and tip portions thereof face the optical aperture.

The blade members on the substrate are divided into a first blade set and a second blade set. The first blade set includes at least two first blade members overlapping with each other. The first blade members are supported at base end portions thereof on the spindles to freely rotate, and tip portions of the first blades are placed inside an edge of the optical aperture when the first blade members are fully closed.

The second blade set includes second blade members overlapping with each other corresponding to the first blade set. The second blade members have a relatively long length, and are supported on the substrate with tip portions thereof placed outside the edge of the optical aperture entirely over an open/close area. The blades configuring an aperture diaphragm include the first blade set including the first blade members with the tip portions entirely facing inside the optical aperture, and the second blade set including the second blade members with the tip portions supported on the substrate around the optical aperture. Accordingly, the system can be relatively compact in size, and be free from malfunction and light variation due to blade deformation.

According to the present invention, the blade members may be divided into the fist blade set including first to third blades in a lower side placement, and the second blade set including fourth to sixth blades in an upper side placement. The blade at a bottom of the second blade set is placed over the blade at a top of the first blade set. Each of the blades of the first blade set is provided with an engagement portion extending from a base end portion thereof. Accordingly, the blades at a same placement order overlap each other at a tip portion of the second blade set and a base end portion of the first blade set through engagement entirely over the open/close area. Further, tip portions of the blades of the second blade set have a shape having an open/close trajectory that does not interfere with an open/close trajectory of the blades of the first blade set at a different placement order.

According to the present invention, the blades of the second blade have a large length and are supported on the substrate. The base end portions are supported by the spindles to freely rotate, and the tip portions are placed outside the aperture edge of the optical aperture entirely over the open/close area. The substrate is formed of first and second substrates opposing each other with a space therebetween. The first blade set and the second blade set are placed on the first substrate in this order, and the second substrate is placed on the second blade set.

DETAILED DESCRIPTION OF PREFERRED EMBODIMENTS

Figure 1:
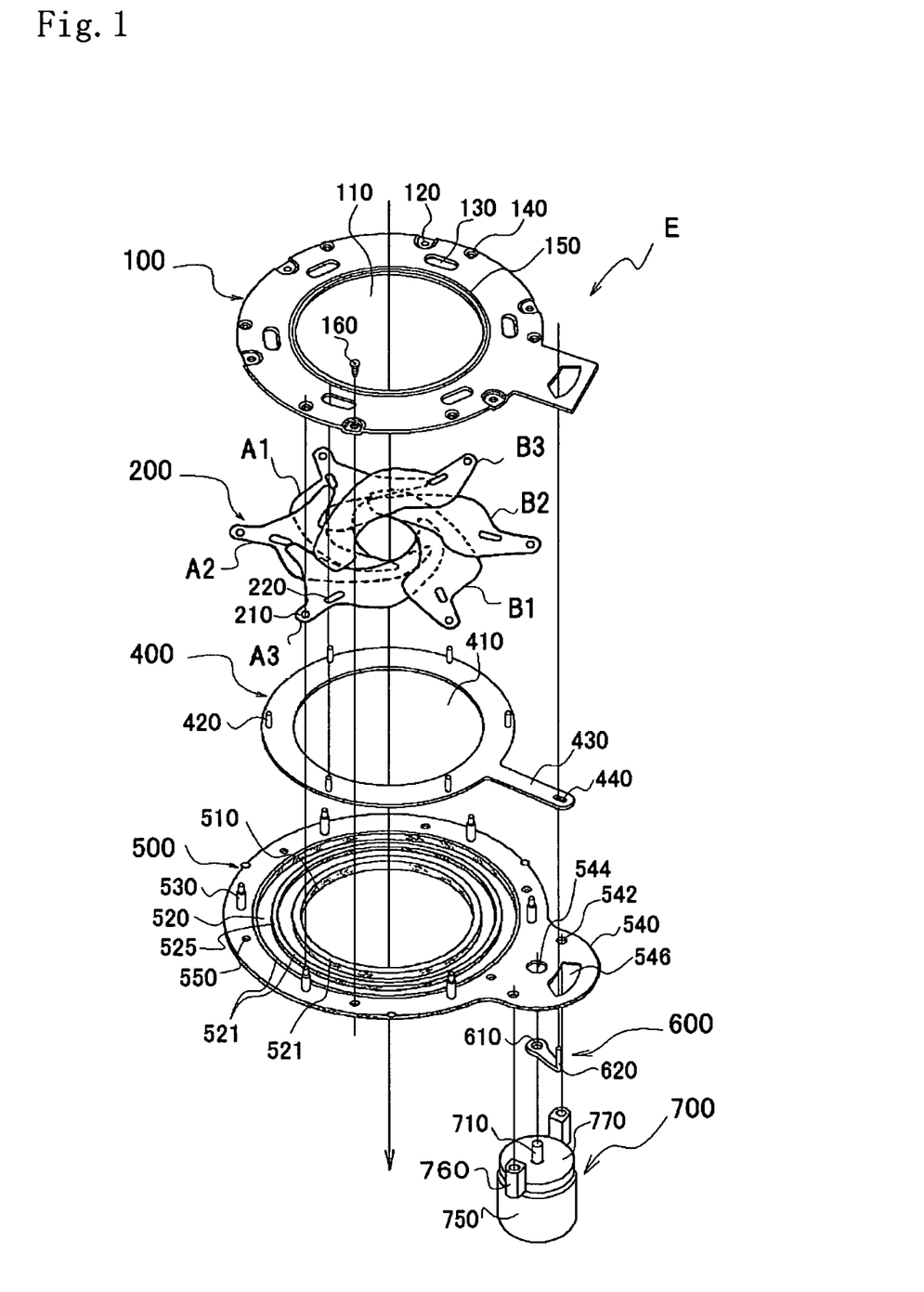
FIG. 1 is an exploded perspective view showing a light regulator according to the present invention.
Figure 2:
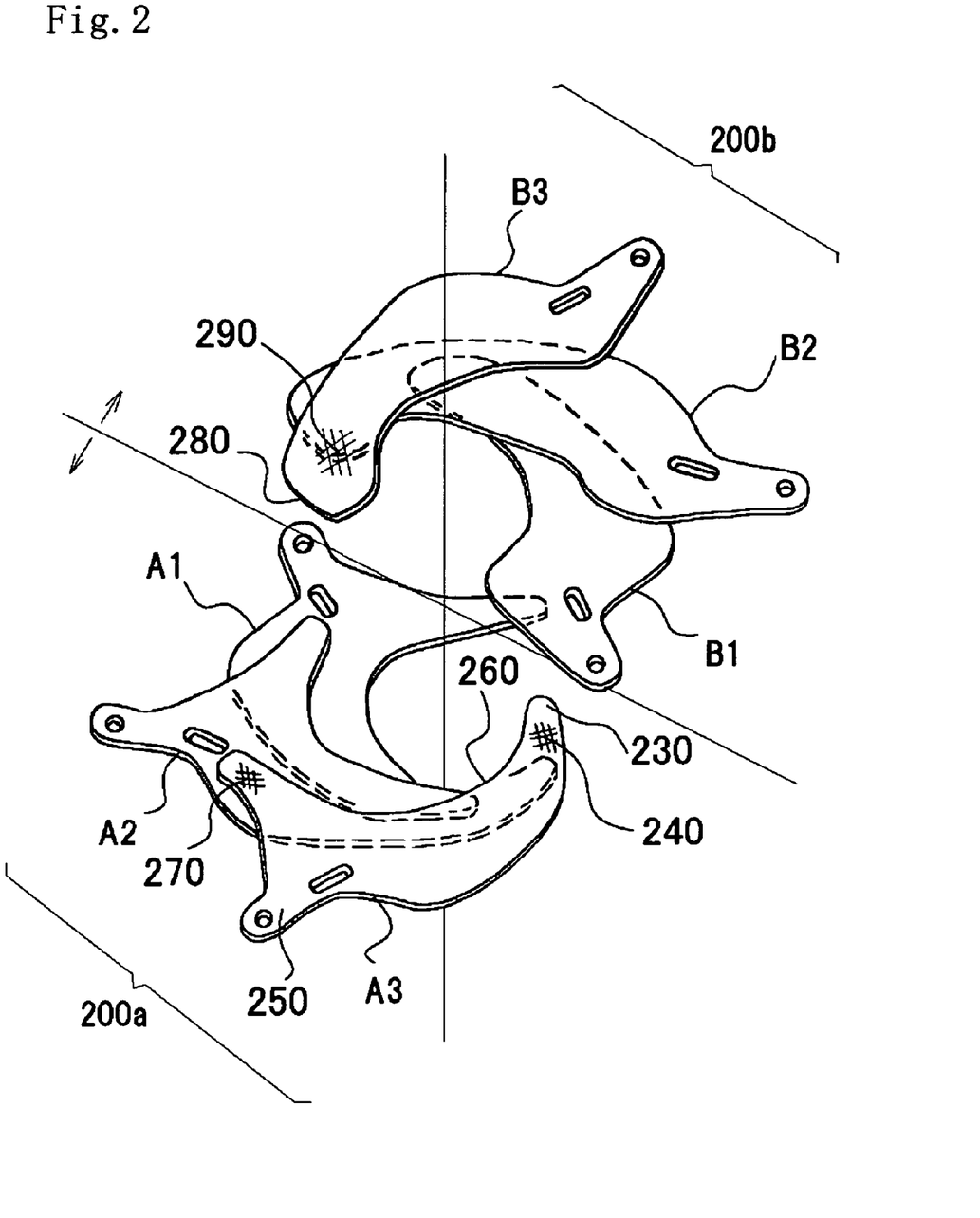
FIG. 2 is a view showing blade members of the light regulator shown in FIG. 1 in an overlapped state.
Figure 3:
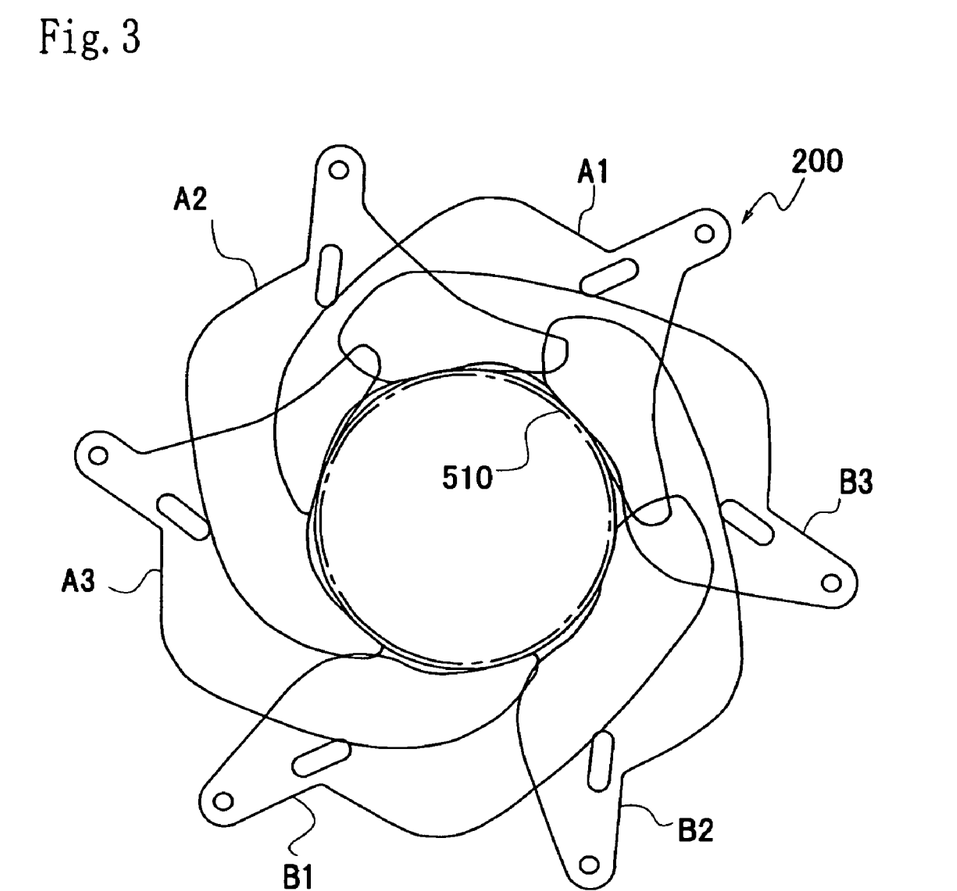
FIG. 3 is a view showing an aperture diaphragm in a fully open state.
Figure 4:
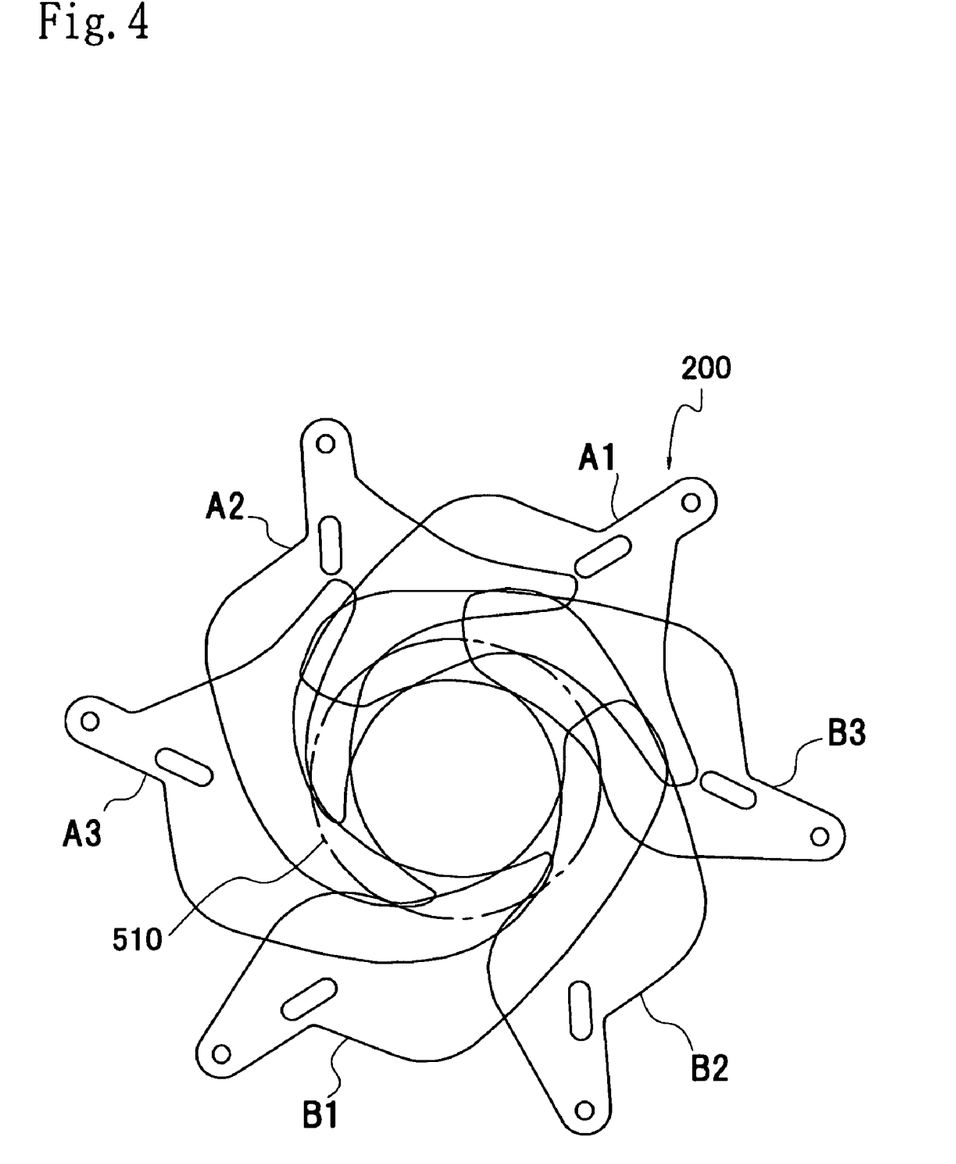
FIG. 4 is a view showing the aperture diaphragm in a state of a wide aperture (large diameter)
Figure 5:
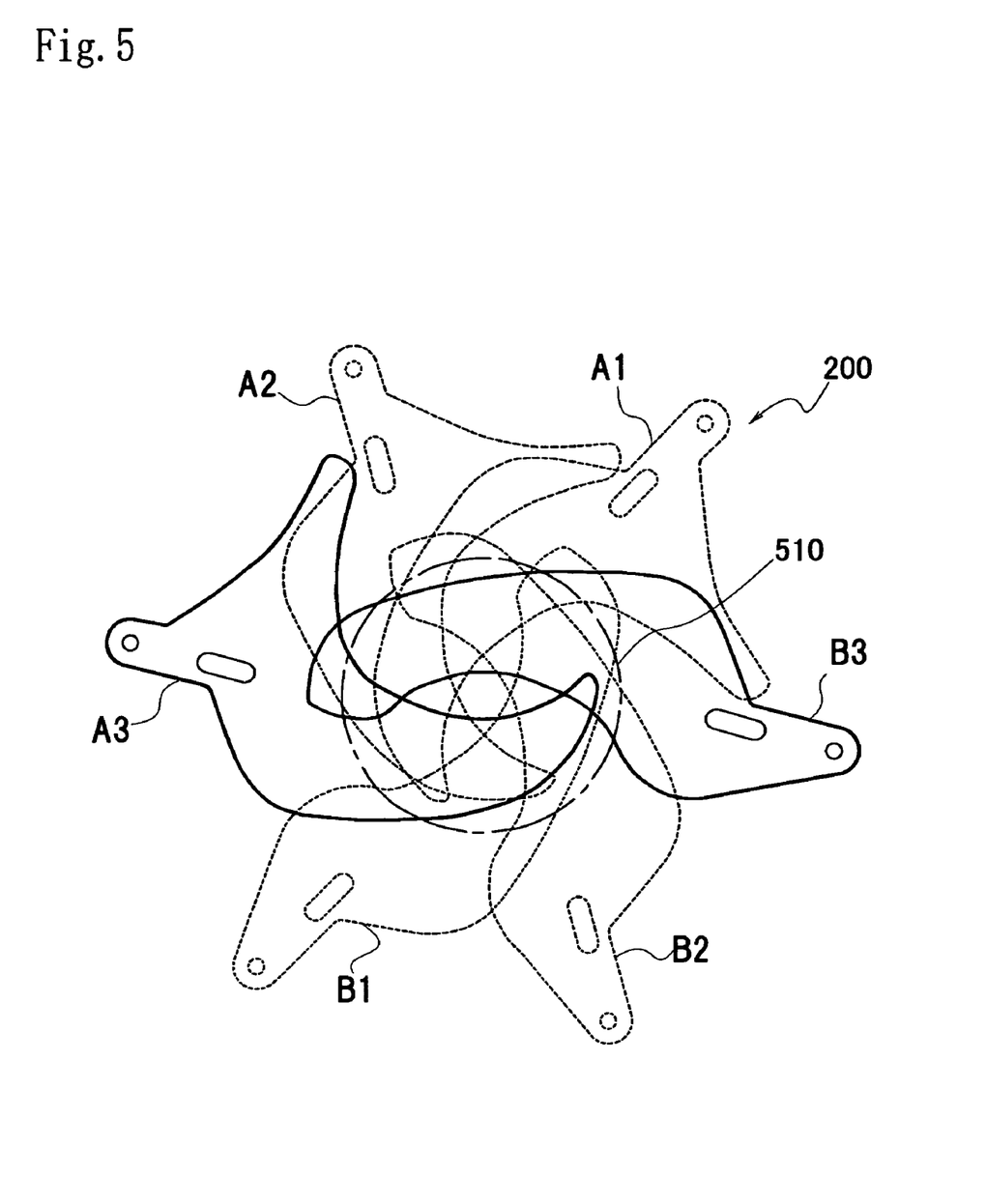
FIG. 5 is a view showing the aperture diaphragm in a state of a half aperture (small diameter)
Figure 6:
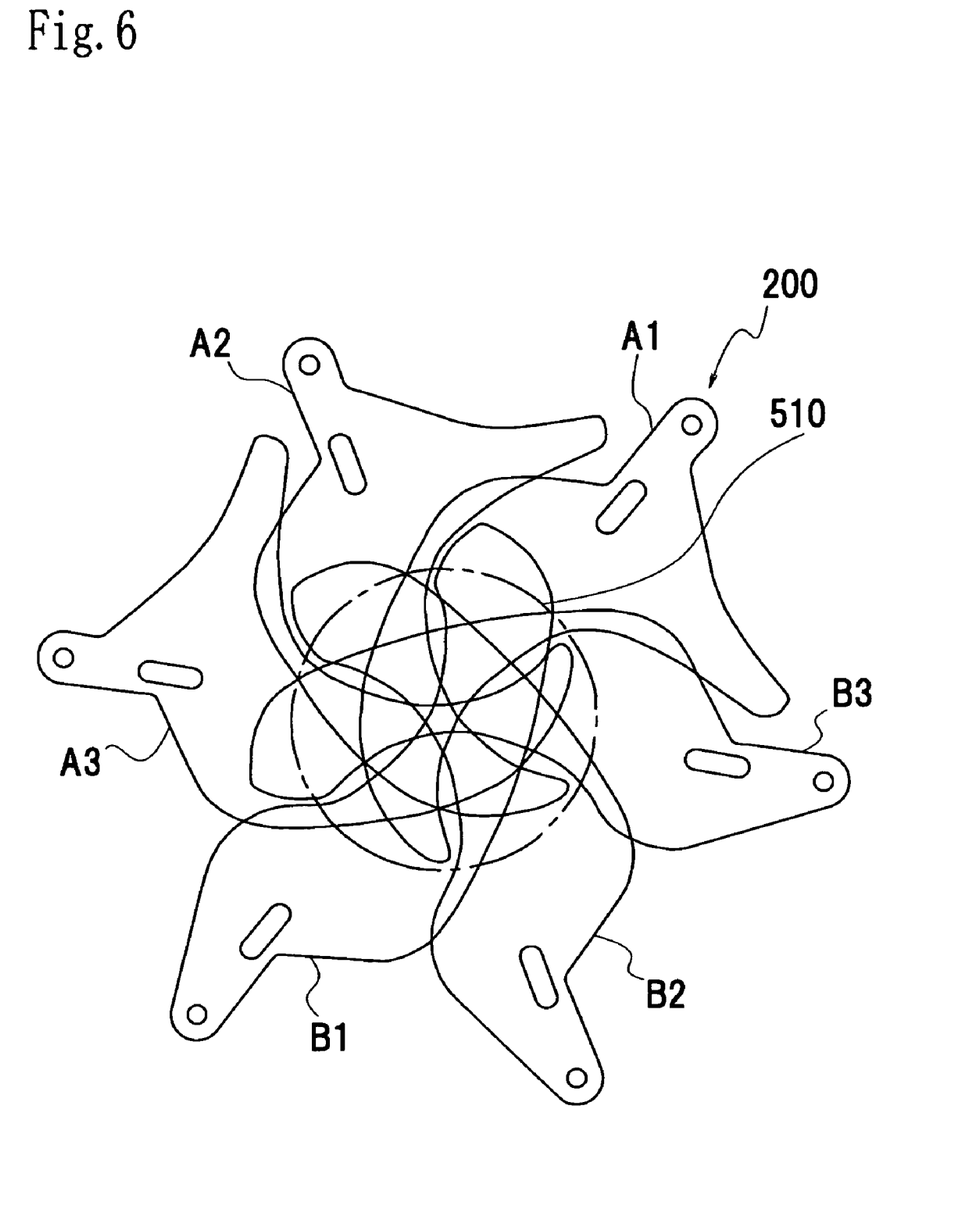
FIG. 6 is a view showing the aperture diaphragm in a fully closed state.
Figure 7A:
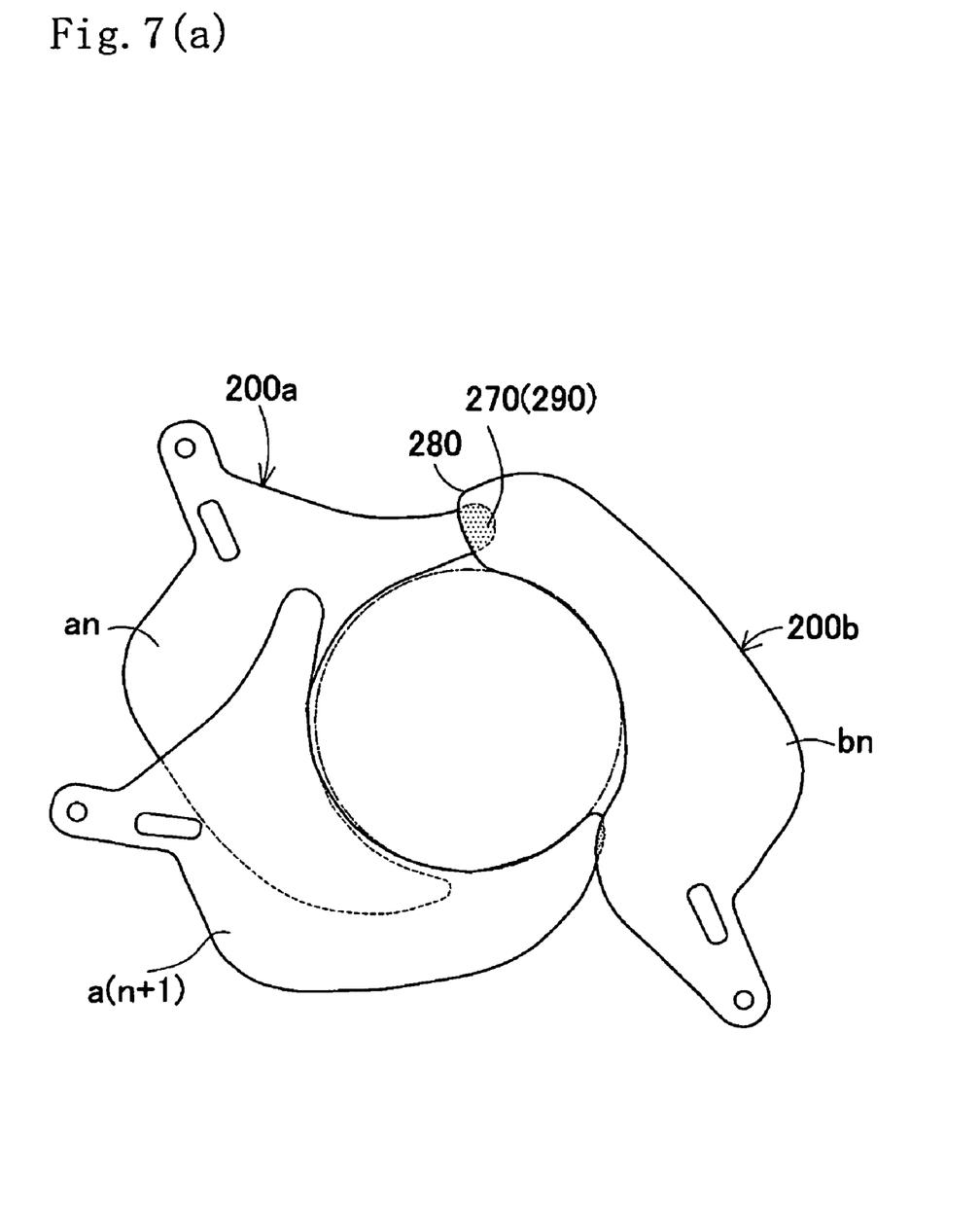
FIG. 7(a) is a view showing blades in a fully open state.
Figure 7B:
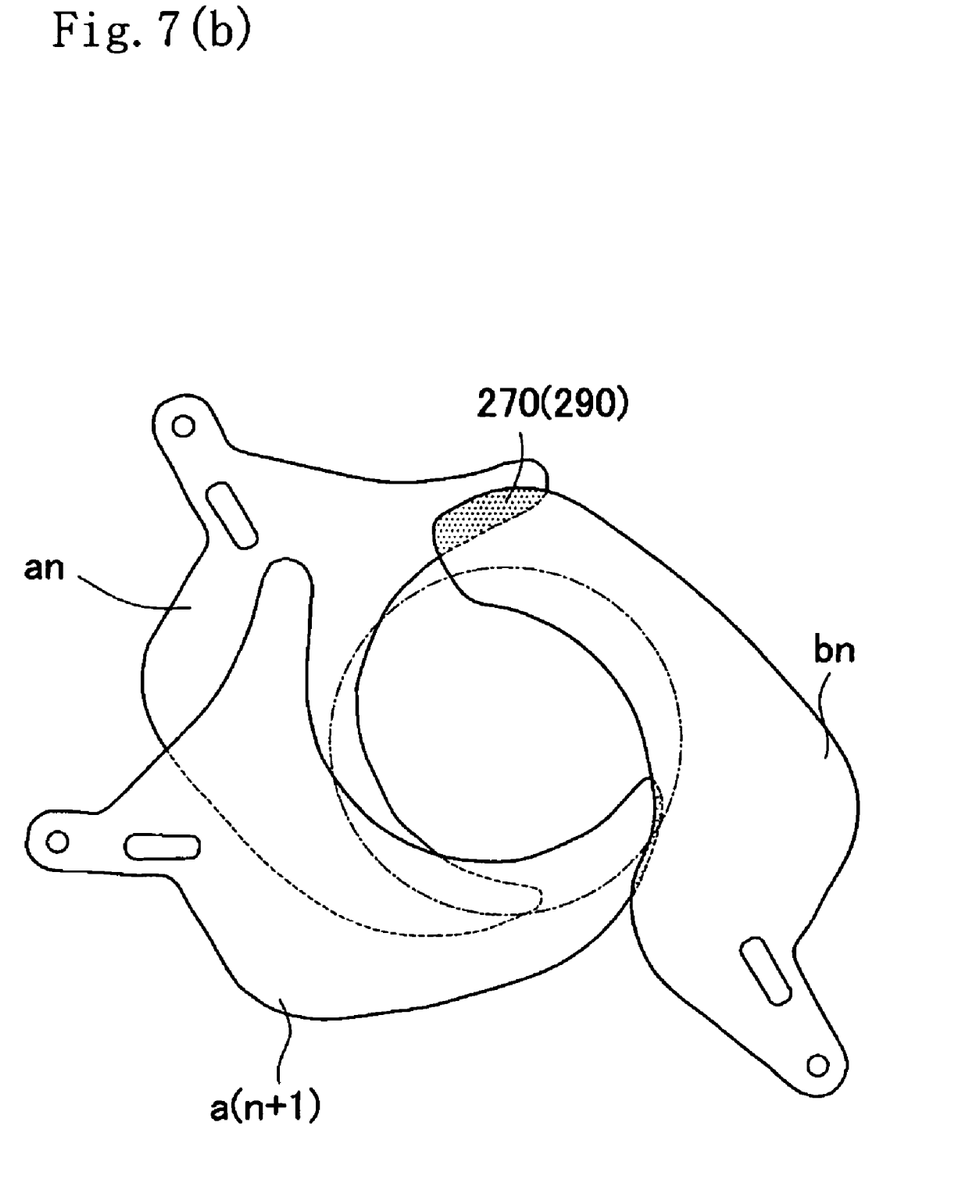
FIG. 7(b) is a view showing the blades in a wide aperture state.
Figure 7C:
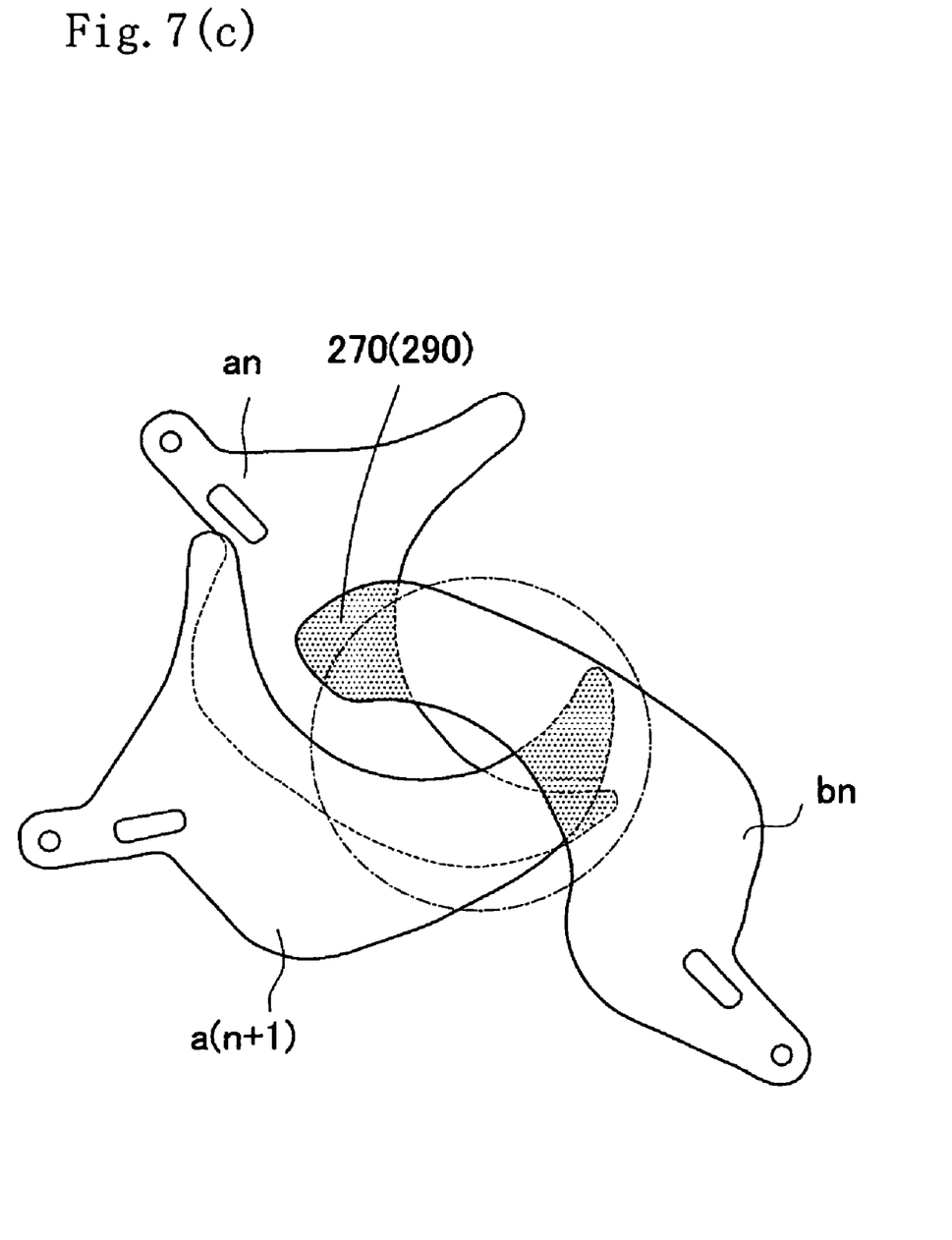
FIG. 7(c) is a view showing the blades in a half aperture state.
Figure 7D:
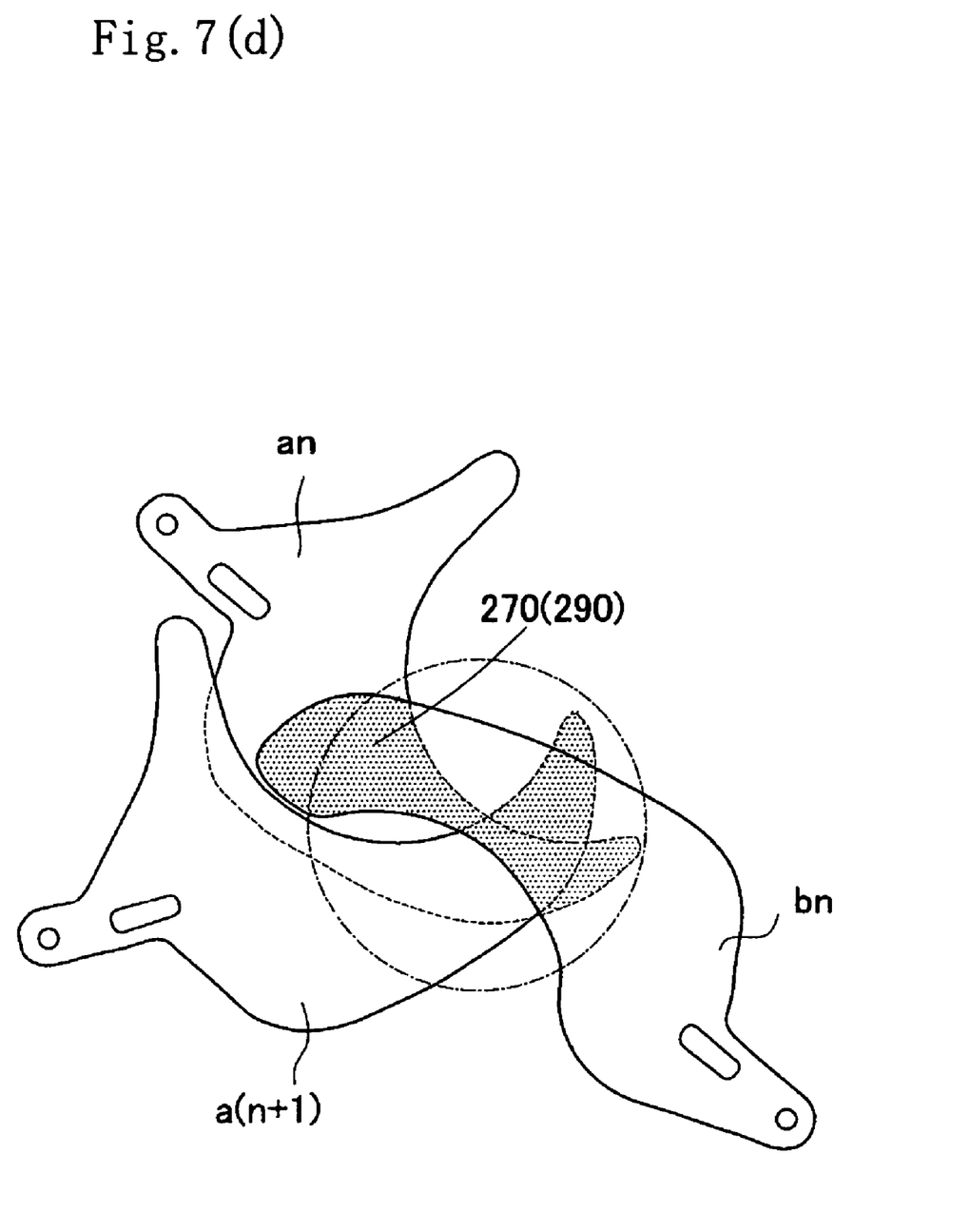
FIG. 7(d) is a view showing the blades in a fully closed state.

Hereunder, embodiments of the present invention will be described in detail with reference to the accompanying drawings. FIG. 1 is an exploded perspective view showing a light regulator according to the present invention. FIG. 2 is a view showing blade members of the light regulator shown in FIG. 1 in a combined (overlapped) state. FIG. 3 is a view showing an aperture diaphragm in a fully open state. FIG. 4 is a view showing the aperture diaphragm in a state of a wide aperture (large diameter). FIG. 5 is a view showing the aperture diaphragm in a state of a half aperture (small diameter). FIG. 6 is a view showing the aperture diaphragm in a fully closed state.

As shown in FIG. 1, a light regulator E of the present invention is configured by a substrate 500; a plurality of blade members 200 (four or more, described later) to be placed at an optical aperture 510 formed in the substrate 500; spindles 530 that support the blade members 200 to freely rotate; a drive unit 700 for opening or closing the blade members 200; and a drive arm 600 for transferring a rotation movement of the drive unit 700 to the blade members 200. The substrate 500 is placed in a lens barrel of a camera unit or a projection section of a projector (described later), and is configured by a base member that is shaped in accordance with such devices. FIG. 1 shows the substrate 500 formed by a pair of plate members to support the blade members 200 by sandwiching those vertically.

The substrate is configured by first and second substrates, and in the below, the first substrate is referred to as a base plate 500, and the second substrate is referred to as a pressure plate 100. The base plate 500 and the pressure plate 100 may be formed in the same shape and material. Generally, the base plate 500 is formed by resin molding to be relatively rigid, and the pressure plate 100 is formed by a metal or resin thin plate to be relatively flexible. The base plate 500 and the pressure plate 100 are provided with optical apertures (hereinafter, simply referred to as apertures) 110 and 510, respectively, at their center. The maximum diameter for the apertures 110 and 510 may be defined at the time of formation of the apertures 110 and 510, or may be first formed larger than the design-required maximum diameter, and defined when the blade members 200 placed thereto are fully open. Herein, the maximum diameter denotes a diameter for regulating the maximum amount of light passing through the optical path.

The base plate 500 is provided with the spindles 530 around the aperture 510 for supporting the blade members 200; a guide rail 525 for guiding the blade members 200; and an annular groove 520 for engaging a shaft lever 400. The spindle 530 is configured by a pin molded (implanted) to be a piece with the base plate 500. The spindles 530 are provided as many as the blade members 200 at equal intervals concentrically to the aperture 110 (described later). In the embodiment shown in FIG. 1, six of the blade members 200 are provided, and the spindle pins 530 are provided at six positions at an angle of 60 degrees. The annular groove 520 formed to the base plate 500 is engaged with the shaft lever 400 that is also annular. The shaft lever 400 is provided with shaft pins 420 at each corresponding position to the blade members 200. The shaft lever 400 is also provided with an arm section 430 for coupling the drive unit 700 to a shaft slit 440 formed thereto.

The drive unit 700 is attached to a drive unit attachment section 540 formed to the base plate 500. The drive unit 700 may have various configurations, and in the embodiment shown in FIG. 1 includes a magnet rotor rotating at a predetermined angle responding to a current supplied to a coil wound around a coil armature supporting the magnet rotor to freely rotate. In the embodiment, a reference numeral 750 denotes an outer yoke, and a reference numeral 770 denotes a cover. A reference numeral 760 denotes an attachment stem that is resin molded as a piece with the coil armature, and fastened securely with screws through screw holes 542 in the base plate 500.

The drive unit 700 is fastened for integration through engagement between an engagement hole 610 of the drive arm 600 and a rotation axis 710 of the magnet rotor. The drive arm 600 is provided with a drive pin 620. The attachment section 540 of the base plate 500 is fastened securely with the stem 760 of the drive unit 700 with the screws through the screw holes 542. The drive pin 620 of the drive arm 600 is inserted through a relief groove 546 in the base plate 500, and engages the shaft slit 440 formed in the shaft lever 400 described above.

With such a structure, when the drive motor receives the current of a predetermined level, a magnetic field occurs to the coil so that the magnet rotor rotates. The rotation movement of the rotation axis 710 is transferred from the drive arm 600 to the shaft lever 400. The shaft lever 400 is guided along the annular groove 520 formed in the base plate 500, and rotates about the optical axis for a predetermined amount around the aperture 110. The shaft pins 420 formed on the shaft lever 400 also rotate for the predetermined amount.

Four or more blade members 200 are overlapped together as a set. The tip portions of the overlapped blades form an aperture diaphragm. When four blades are overlapped together, the aperture diaphragm is in a shape of substantially square, and with five blades, the aperture diaphragm will be shaped substantially pentagon. As the number of blades is increased, the polygonal-shaped aperture diaphragm becomes more round. The aperture diaphragm formed by the blade tip portions as such preferably maintains a similar shape even if the aperture diaphragm is changed in diameter. A determination factor for the appropriate number of blades is both the shape of the aperture diaphragm, and the shape change when it is opened or closed. The number of blades is generally five, six, or eight.

In the present invention, the blade members 200 (in the below, referred simply to as blades) are separated into two sets. A first blade set 200a includes two or more blades, preferably one half the total number n of the blades (½n). Each of the blades is provided with a spindle hole 210 at a base end portion thereof for engaging the corresponding spindle 530 formed on the base plate 500. Such two or more blades, or one half n blades, overlap their adjacent edge portions. The blades A1, A2, and A3 are so formed as to be at least in the close state (position) at their tip portions so as to be inside the aperture 110.

With this configuration, the blades of the first blade set 200a is supported at their base end portions by the guide rail 525 of the base plate 500, and along the guide surface of the guide rail 525, undulates about the spindles 530. Accordingly, the blades are supported by the base plate 500 only at their base end portions, and their tip portions are facing the aperture 110. The blades of the first blade set 200a configured as such are acute-angled, relatively short in length, and narrow in width so that an overlapping area is small.

The remaining second blade set 200b is configured similarly to the first blade set 200a. That is, the spindle holes 210 formed in the blade base end portions are supportively engaged with their corresponding spindles 530, and the adjacent edge portions are overlapped one another. The second blade set 200b is so placed that their tip portions come outside the edge of the aperture 110 of the base plate 500 entirely over the open/close area for support by a base plate guide surface 521. With such blade placement, the second blade set 200b becomes consequentially wide in width, and relatively long in length to prevent a gap between the blade outer edges and aperture edge when the blades are fully closed so that their overlapping area becomes larger.

When the blades of the first and second blade sets 200a and 200b are overlapped one another, the second blade set 200b is placed over the first blade set 200a. FIG. 2 shows a configuration of six blades, three for the first blade set 200a, and three for the second blade set 200b. As shown in FIG. 2, the first blade set 200a is configured by overlapping the blade A2 on the blade A1, and the blade A3 on the blade A2. The second blade set 200b is placed on the first blade set 200a, and is configured by a blade B2 on a blade B1, and a blade B3 on the blade B2. Accordingly, the blade B1 at the bottom of the second blade set 200b is placed over the blade A3 at the top of the first blade set 200a, and the six blades form a diaphragm aperture at their tip portions.

With such blade placement, the blades are supported by each corresponding spindle 530 at their base end portions, and the slits 220 engage the corresponding shaft pins 420 formed on the shaft lever 400. In response to the rotation movement of the shaft lever 400, the blades are rotated in the direction for opening or closing. When the first and second blade sets 200a and 200b of the same configuration are overlapped together for interference-free rotation, the second blade set 200b may interfere with the first blade set 200a, thereby preventing the blades from smoothly opening or closing. For example, the tip portions of the blades of the second blade set 200a located at the upper (higher) part of the blade stack may hang down due to their own weight or vibration, and may impinge on the base end portions of the blades of the first blade set 200a in the close vicinity, thereby disabling the operation thereafter.

Therefore, in the present invention, the vertically-separated first and second blade sets 200a and 200b are combined as below for preventing possible interference therebetween when they open or close. As to the first and second blade sets 200a and 200b, their blades at the same placement order are overlapped each other at the blade tip portion of the second blade set and at the blade base end portion of the first blade set 200a entirely over the open/close area. As shown in FIG. 2, at the blade base end portions of the first blade set 200a, an engagement surface 270 protruding in a direction opposite (reverse) to the tip portions configuring the diaphragm aperture. The engagement surface 270 (overlapping portion) is placed so as to always overlap on tip portions 280 of the blades of the second blade set 200b entirely over the blade open/close area.

As shown in FIGS. 7(a) to 7(d), the overlapping states of the blades is described next. As to the two sets of blades stacked in the same order, i.e., the first and second blade sets 200a and 200b, their blades open or close with the engagement surfaces 270 of the blades of the first blade set 200a vertically overlapped with other engagement surfaces 290 formed at the tip portions 280 of the blades of the second blade set 200b. Such a configuration is applicable to the cases of FIGS. 7(a) to 7(d), i.e., fully-open state of FIG. 7(a), large-diameter wide-aperture state of FIG. 7(b), the small-diameter half-wide-aperture state of FIG. 7(c), and the fully-closed state of FIG. 7(d). Accordingly, the engagement surfaces are formed to the blades of the first and second blade sets 200a and 200b so as to put the blades always at their right positions entirely over the blade open/close area.

The tip portions 280 of the blades of the second blade set 200b stay away from a blade "A(n+1)" (refer to FIGS. 7(a) to 7(d)) which belongs to the first blade set 200a locating at the upper part of the blade stack so as not to overlap thereon. This is applicable to the fully-open state of FIG. 7(a), wide-aperture state of FIG. 7(b), the half-wide aperture state of FIG. 7(c), and the fully-closed state of FIG. 7(d). That is, the tip portions 280 of the blades of the second blade set 200b are always engaged in the vertical direction with the blades of the first blade set 200a stacked in the same order. The tip portions 280 of the blades of the second blade set 200b open and close along the movement trajectory, which always stays away from the blade member A(n+1) placed on the first blade set 200a.

In a case of six blades with the above-described blade placement, the blades A1 to A3 of the first blade set 200a are stacked together in the same order as the blades B1 to B3 of the second blade set 200b, i.e., the blades A1 and B1 are at the same order, and so are the blades A2 and B2, and the blades A3 and B3. As to the blades A1 and B1, the engagement surface 270 at the base end portion of the blade A1 overlaps with the engagement surface 290 at the tip portion of the blade B1 entirely over the open/close area. The tip portion 280 of the blade B1 is located outside the open/close trajectory for the blade A2 to prevent interference therebetween.

Similarly, the blades A2 and B2 are overlapped each other at the base end portion of the blade A2 to prevent interference between the tip of the blade B2 and the blade A3, which is located upper to the blade B2. With such a configuration, as to the differently-shaped blades of the first and second blade sets 200a and 200b, the blades at the same placement order overlap each other entirely over the open/close area so that no interference occurs. Further, the blades of the second blade set move along the trajectory to open or close without interfering with the corresponding blades of the first blade set that is placed therebelow.

As shown in FIG. 2, the six blades will be described in more detail. As described above, the blade 200 is configured by the first blade set 200a including the blades A1 to A3, and the second blade set 200b including the blades B1 to B3. The blades of the first blade set 200a are relatively short in the entire length, each provided with a shield section 240. Specifically, as shown in FIG. 6, the blades have such a length that their blade tips 230 do not bridge-support the aperture 510 when they are fully closed (described later). The blades are also each provided with the engagement surface 270 that is provided in a connected row arrangement from the blade base end portion 250 in the vicinity of the rotation center to an aperture edge 260, and extending in the direction opposite to the blade tip 230 around the aperture 510. The engagement surface 270 is overlapped with the engagement surface 290 of the blade of the second blade set 200b.

As shown in FIGS. 3 to 6, the blades of the second blade set 200b are relatively long in the entire length to bridge-support the aperture 510 formed in the base plate 500 entirely over the open/close area. Specifically, the length is so set as not to interfere with the aperture edges 260 of the blades of the first blade set 200a in the process to fully close. Accordingly, the aperture 510 of the base plate 500 is closed in compact with the small blades of the first blade set 200a, and using the relatively-long blades of the second blade member 200b, the gap between the blades of the first blade set 200a and the aperture 510 is covered, so that the system can be successfully downsized.

An assembly process of the system shown in FIG. 1 will be explained next. The shaft lever 400 is snapped into the annular groove 520 of the base plate 500 in such a position as shown in the drawing. From the above, the blade A1 of the blade 200 is engaged into its corresponding spindle 530 formed on the base plate 500, and the shaft pin 420 of the shaft lever 400 is snapped into the slit hole 220. Thereafter, the blades A2 and A3 are each placed thereover in the similar manner. On the blade A3, the blade B1 of the second blade set 200b is first placed, and then the blades B2 and B3 are placed thereover. Over the blade B3, the pressure plate 100 (second substrate) is placed as shown, and screwed at six positions using screws 160, so that the light regulation unit is completed.

To assemble the drive unit 700, a magnet rotor is formed by sintering or the like, and the resulting rotor is provided with a coil armature to freely rotate. The coil armature is wound around a coil. The coil armature is vertically or laterally separated into two, and sandwiched by the cover 770, i.e., upper and lower cover, for engaging the yoke 750. Thereafter, the drive arm 600 is attached to the rotation axis 710 as appropriate so that the drive unit 700 is completed.

The slit hole 440 of the shaft lever 400 is then snapped with the drive pin 620 of the drive arm 600 that is fixed to the drive unit 700, and a protection cover is so placed as to cover the drive arm 600, so that the drive unit 700 is placed at the back of the base plate 500. The protection cover is then screwed into the stem 760 of the drive unit 700 for attachment to the drive unit 700.

FIG. 3 shows the fully-open state of the blade 200. FIG. 4 shows the state immediately after the aperture diaphragm starts to close with 1 Ev (Exposure value). FIG. 5 shows the state immediately before the aperture diaphragm is completely closed with 4 Ev. FIG. 6 shows the fully-closed state of the blade 200. The outline of the aperture diaphragm formed by the blade members can keep almost the polygonal shape, thereby preventing exposure inconsistencies, diffraction, or others, and successfully eliminating the possibility of causing image quality degradation. As shown in FIG. 6, the tip portions 280 of the blades of the second blade set 200b do not interfere with the aperture edges 260 of the blades of the first blade set 200a. Accordingly, the aperture diaphragm can open or close smoothly with no blade getting stack in one another due to vibration or impact.

Figure 8:
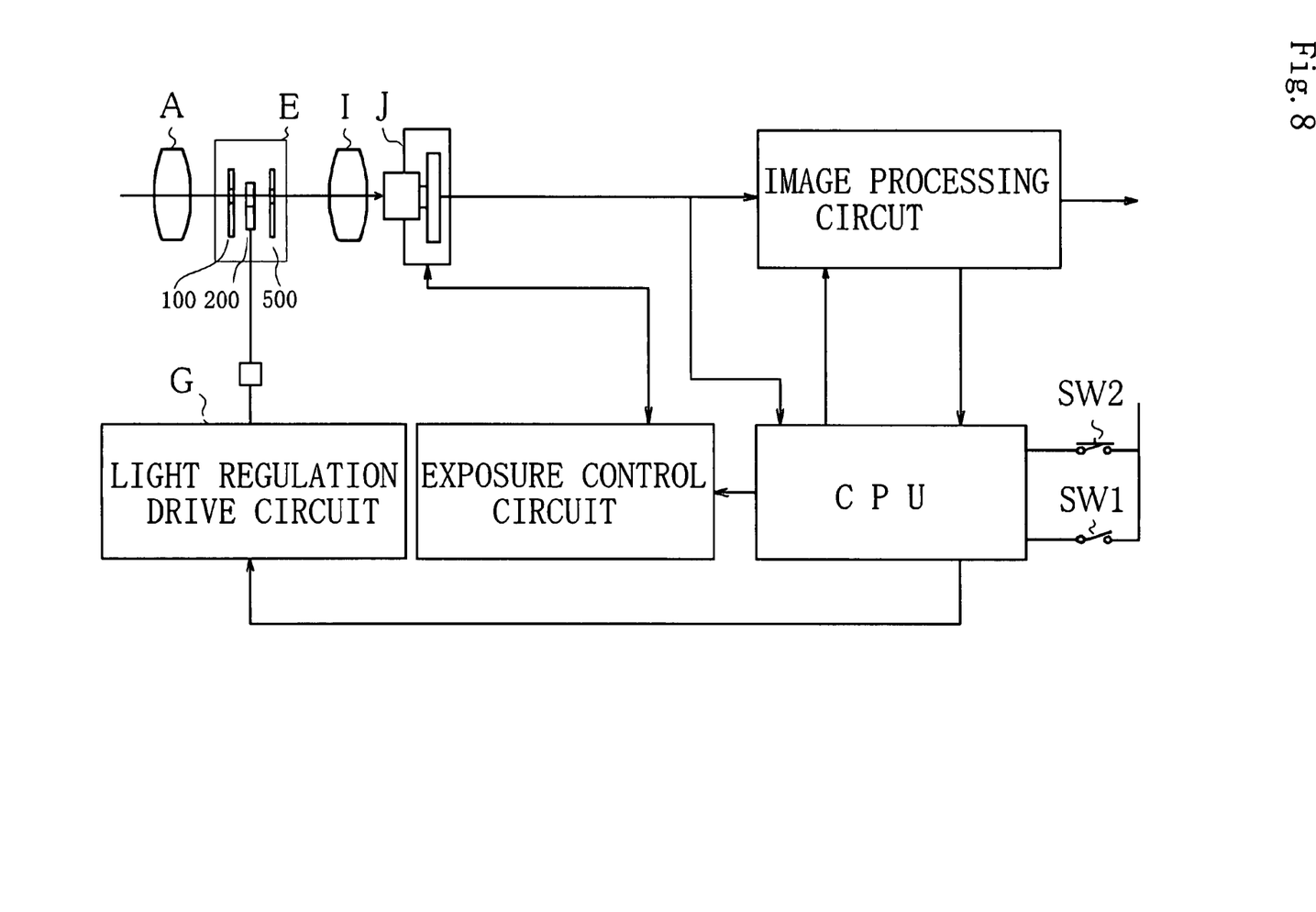
FIG. 8 is a schematic diagram showing an image pickup system having the light regulator according to the present invention.

FIG. 8 is a diagram illustrating the configuration of an image pickup system provided with the above-described light regulator. In the drawing, a reference character E denotes the light regulator, and a reference character G denotes a light regulation drive circuit. A reference character A denotes a front-cell focusing lens for image pickup, a reference character I denotes a condenser (image-forming lens), and a reference character J denotes a solid-state image pickup device such as CCD or the like. The solid-state image pickup device J outputs an image signal, which is transferred to an image signal processing circuit. The image signal is then subjected to an image process for storage into memory, for example.

In the drawing, a reference character SW2 denotes a shutter release switch, SW1 a main switch, and a CPU a micro computer. For image pickup, the subject brightness coming from the solid-state image pickup device J is detected in light amount, and then the CPU computes the exposure time. The computation result is used as a basis for an exposure control circuit to control the charge accumulation and discharge of the solid-state image pickup device J. The light regulation drive circuit for driving the blade captures image data with the appropriate exposure level, and the image data is subjected to a computation process by the image signal processing circuit and the CPU for accumulation in a storage unit or a storage element.

Figure 9:
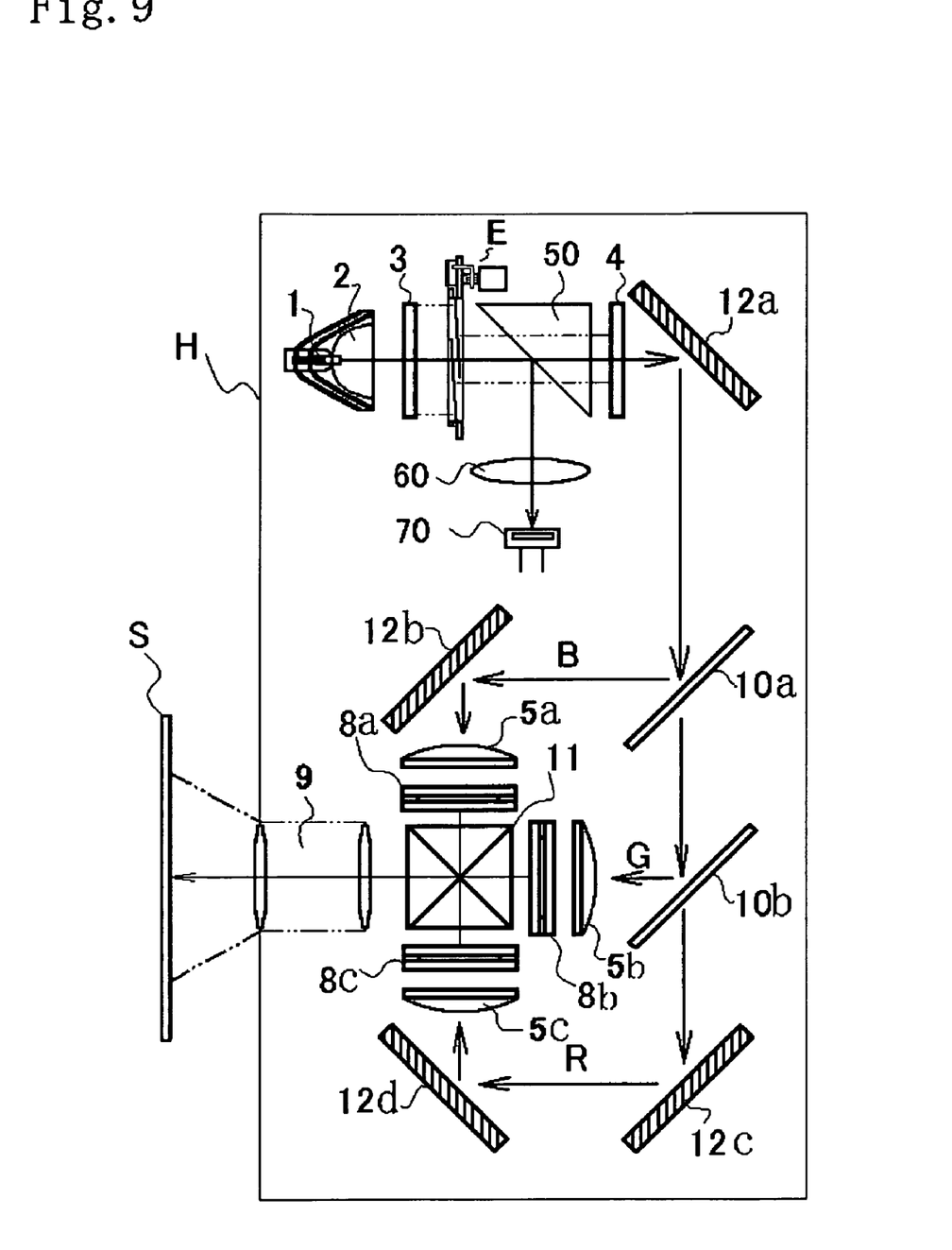
FIG. 9 is a schematic diagram showing a projector according to the present invention.

FIG. 9 shows a projector, and an image formation device such as a liquid crystal panel is exposed to light coming from a light source P1. The resulting image formed by the image formation device is projected onto a screen using a projection lens. The light source P1 is a lamp light source such as a metal halide lamp, high-pressure mercury lamp, NSH lamp, xenon lamp, VIP lamp, and the like. Light coming from the lamp is reflected by a spherical reflection mirror 2, and goes through a filter 3 that allows no infrared radiation or ultraviolet radiation so as to eliminate any unnecessary infrared and ultraviolet radiation. Thereafter, the light is appropriately controlled in intensity by the light regulator E, goes through an integrator lens 4, and is directed substantially at 90 degrees by a reflection mirror 12a. Thereafter, the light is reflected and separated by a dichroic mirror 10a having the characteristics of passing through the light of both G and R wavelengths, and reflecting the light of B wavelength. The resulting light of B wavelength is directed substantially at 90 degrees by a reflection mirror 12b, and then gathered by a condenser 5a into the parallel light. The gathered light is passed through a liquid crystal panel 8a to reach a composite prism 11 as images of B wavelength.

The light of G wavelength passing through the dichroic mirror 10a is reflected and separated by a dichroic mirror 10b at the second stage having the characteristics of passing through the light of R wavelength but reflecting the light of G wavelength. The resulting light of G wavelength is gathered by a condenser 5b into the parallel light. The gathered light is passed through a liquid crystal panel 8b to reach the composite prism 11 as images of G wavelength. The light of R wavelength passing through the dichroic mirror 10a is also reflected and separated by the dichroic mirror 10b at the second stage having the characteristics of passing through the light of R wavelength but reflecting the light of G wavelength. The resulting light of R wavelength is directed substantially at 90 degrees by reflection mirrors 12c and 12d, gathered by a condenser 5c into the parallel light. The gathered light is passed through a liquid crystal panel 8c, and reaches the composite prism 11 as images of R wavelength. The B, G, and R image light reached the composite prism 11 at the same time are combined together, and the result is enlarged as appropriate by a projection lens 9 for projection in color onto a front screen S or others.

The light appropriately controlled in intensity by the light regulator E is partially split by a half mirror 50 (or dichroic mirror). The split light is received by an optical sensor 70, e.g., photodiode, through a condenser 60. Then, an output signal coming from the optical sensor 70 indicating the light amount when detected by the CPU in the main system is directly captured by the light regulation drive circuit for comparison with the appropriate light amount. The comparison result is used as a basis to drive-control the light regulator E so that any detection value difference resulted from temperature change is suppressed for light regulation in an appropriate manner. As such a light regulator, the system shown in FIG. 1 is incorporated. Thus, the light regulation section can be down-sized and compact in size.

As described above, in the present invention, a plurality of blades is spaced uniformly on a substrate with an optical aperture to configure an aperture diaphragm by facing the tip portions of the blades toward the optical aperture. The blades are separated into the first and second blade sets. The tip portions of the blades of the first blade set are located inside the aperture when fully closed, and the tip portions of the blades of the second blade set are supported by the substrate around the optical aperture entirely over the open/close area. With such a configuration, the system can be relatively small, and free from blade deformation, which has been a cause of preventing open/close operation or smooth blade opening/closing. Accordingly, no light variation is caused due to blade deformation, and no light inconsistencies occur at the time of image pickup and projection.

The first and second blade sets are each formed with an overlapping portion (engagement portion) entirely over the open/close area to keep the blades at their placement order. The blades are so configured as to open and close along their own interference-free trajectory, and thus their open/close operation is smooth. Even if the blades are deformed to some degree, their operation suffers no adverse effects. As such, in the present invention, the number of blades is even, and a half thereof belong to the first blade set, and the remaining half belong to the second blade set. With such a configuration, every blade is placed in order, leading to free-interference configuration with better achievement. As an alternative configuration, the first blade set may be relatively short in length and acute-angled, so that their tip portions form an aperture. The gap possibly generated between such short blades and the aperture edge is covered by the second blade set. With the configuration, the system can be downsized to a greater degree, and the load for opening/closing the blades can be accordingly reduced.

The disclosure of Japanese Patent Application No. 2004-235751, filed on Aug. 13, 2004, is incorporated in the application.

While the invention has been explained with reference to the specific embodiments of the invention, the explanation is illustrative and the invention is limited only by the appended claims.

What is claimed is:

1. A light regulator comprising:
   a substrate having an optical aperture and spindles, and
   a plurality of blade members arranged substantially uniformly around the optical aperture to be overlapped with each other at adjacent edges thereof, and having base end portions free rotationally supported by the spindles and tip portions facing the optical aperture, said blade members including a first blade set at a lower side placement and a second blade set at an upper side placement, said first blade set having at least two first blade members overlapping each other and having the tip portions situated inside an aperture edge of the optical aperture when the first blade members fully close the optical aperture, said second blade set having second blade members overlapping each other with a number same as the first blade members and the tip portions situated outside the aperture edge of the optical aperture within an entire moving range of the second blade members and supported by the substrate, said first and second blade sets being arranged such that one of the second blade members at a bottom of the second blade set is situated above one of the first blade members at a top of the first blade set, said first blade members having the base end portions engaging and overlapping with the tip portions of the corresponding second blade members at a same placement order within an entire moving range of the first blade members, said second blade members moving such that the tip portions thereof move along trajectories without interfering with trajectories of the first blade members at different placement orders.

2. A light regulator according to claim 1, wherein said substrate includes a first substrate and a second substrate facing each other with a space therebetween, said first blade set and said second blade set being placed on the first substrate in this order, said second substrate being placed on the second blade set.

3. A light regulator according to claim 1, wherein said plurality of the blade members includes an even number n of the blade members where n is six or more, said first blade members including first to n/2-th blade members from a bottom, and said second blade members including (n/2+1)-th to n/2-th blade members.

4. A light regulator according to claim 1, wherein said plurality of the blade members includes six blade members, said first blade members including first to third blade members from a bottom with a first length, said second blade members including fourth to sixth blade members with a second length larger than the first length.

5. A light regulator according to claim 4, wherein each of said first blade members includes an engagement portion protruding from the base end portion thereof for engaging the second blade member corresponding thereto.

6. An image pickup system comprising a lens barrel including an image pickup optical path, an image pickup device for picking up an image coming from the lens barrel, and the light regulator according to claim 1.

7. An image pickup system comprising a light source, an image formation device, a projection device for projecting light coming from the image formation device, and the light regulator according to claim 1.

* * * * *